United States Patent Office 3,516,993
Patented June 23, 1970

3,516,993
BENZYLIDENE-SUBSTITUTED NITROGENOUS HETEROCYCLIC COMPOUNDS
William J. Houlihan, Mountain Lakes, and Robert E. Manning, Parsippany, N.J., assignors to Sandoz-Wander, Inc., a corporation of Delaware
No Drawing. Filed Mar. 15, 1967, Ser. No. 623,214
Int. Cl. C07d *41/00*
U.S. Cl. 260—240                                    9 Claims

ABSTRACT OF THE DISCLOSURE

The compounds are benzylidene-substituted derivatives of 1H-2,3,4,5,6,7-hexahydrobenzazonines, 1,2,3,4,5,6,7,8-octahydro-3-benzazecines, and 5,6,8,13-tetrahydrodibenz[c,f]azonines, respective examples of which are 7-benzylidene - 9,10 - dimethoxy-3-methyl-1H-2,3,4,5,6,7-hexahydro - 3 - benzazonine; 8 - (p-chlorobenzylidene)-3-methyl-1,2,3,4,5,6,7,8-octahydro - 3 - benzazecine and 13-benzylidene - 2,3-dimethoxy-7-methyl-5,6,8,13-tetrahydrodibenz[c,f]azonine. The compounds are useful as anti-inflammatories. In preparing said compounds a suitable intermediate, i.e. a 10b-benzyl-substituted 1,2,3,5,6,10b-hexahydropyrrolo[2,1-a]isoquinoline; a 11b-benzyl-substituted 1,2,3,4,6,7 - hexahydro - 11bH - benzo[a]quinolizine or a 12b - benzyl - substituted - 5,6,8,12b-tetrahydroisoindolo[1,2-a]isoquinoline, is converted to a quaternary ammonium halide thereof, by treatment with a lower hydrocarbon halide, e.g. $CH_3I$, which is then subjected to an elimination reaction by heating with a alkali metal lower alkoxide, e.g. $NaOCH_3$.

This invention relates to compounds of the following formulae:

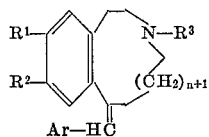

I wherein $n$, $R^1$, $R^2$, $R^3$ and Ar are as defined below and

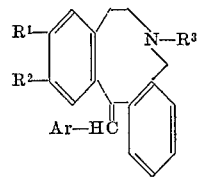

II wherein
$n$ is 0 or 1;
$R^1$ is a member selected from the group consisting of a hydrogen atom, linear alkyl having from 1 to 4 carbon atoms, e.g. methyl, ethyl, propyl and butyl, linear alkoxy having from 1 to 4 carbon atoms, e.g. methoxy, ethoxy, propoxy and butoxy, and taken together with $R^2$, methylenedioxy (—O—CH$_2$—O—);
$R^2$ is a member selected from the group consisting of a hydrogen atom, linear alkyl having from 1 to 4 carbon atoms, linear alkoxy having from 1 to 4 carbon atoms and, taken together with $R^1$, methylenedioxy;
$R^3$ is a member selected from the group consisting of allyl, crotonyl and linear alkyl having from 1 to 4 carbon atoms; and Ar is of the formula:

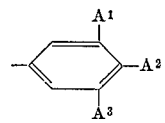

wherein each of $A^1$, $A^2$ and $A^3$, independently, is a member selected from the group consisting of a hydrogen atom, fluoro, chloro, linear alkyl having from 1 to 4 carbon atoms, linear alkoxy having from 1 to 4 carbon atoms and, taken together with its adjacent counterpart, methylenedioxy; and
to intermediates in the preparation thereof, pharmaceutically acceptable acid addition salts thereof and pharmaceutically acceptable quaternary ammonium salts thereof.
Compounds I include compounds of the classes I*a* and I*b*:

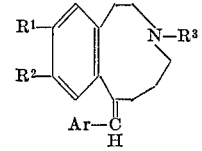

Ia wherein $R^1$, $R^2$, $R^3$ and Ar are as defined above, and

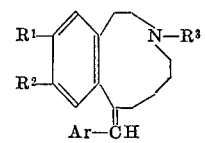

Ib wherein $R^1$, $R^2$, $R^3$ and Ar are as defined above.
Compounds I*a* represent compounds I wherein $n$ is 0 and compounds I*b* represent compounds I wherein $n$ is 1.
Compounds I, may be prepared according to the following reaction scheme A, presented below; wherein $n$, Ar, $R^1$, $R^2$ and $R^3$ are as defined above, and X is a member selected from the group consisting of chloro, bromo and iodo.
In the reaction scheme A compound VI is represented by a single structural formula, however compound VI also exists in another tautomeric form as shown below ($n$, Ar, $R^1$ and $R^2$ being as defined above).

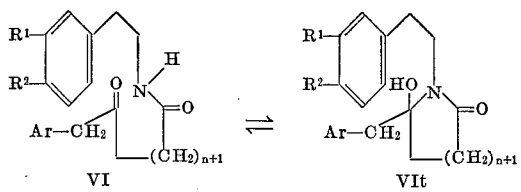

In view of the double bond of the benzylidene structure of compounds I and II, geometric isomers thereof exist and such isomers are within the scope of the invention.

Reaction Scheme A

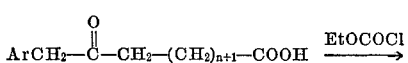

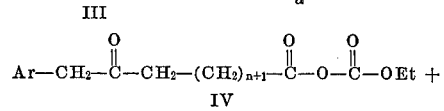

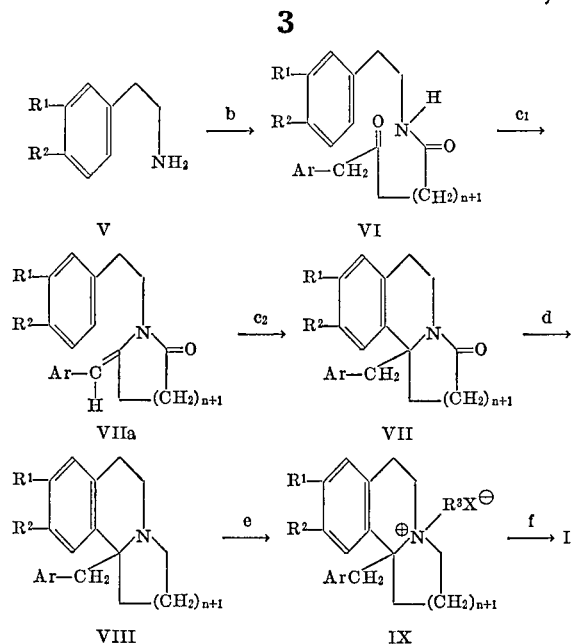

According to the reaction scheme A for the preparation of compounds I, Steps *a* and *b* are effected sequentially (without separation) to form compound VI (an amide) by reacting ethyl chloroformate (ethyl chlorocarbonate) with compound III (a keto acid) in the presence of triethylamine in chloroform at a temperature from 0° to 15° C., followed by the admixture of compound V, e.g. a phenylethylamine.

Step *c* is a two-stage cyclization. Stages $c_1$ and $c_2$ are effected sequentially (without separation) with a strong acid, e.g. from a 0.5 to 5.0 weight percent methanolic solution of hydrogen chloride, at a temperature from room temperature (20° C.) to reflux; with polyphosphoric acid at a temperature from 60° to 120° C. or with p-toluenesulfonic acid in toluene under reflux.

In Step *d*, compound VII is reduced to compound VIII by heating compound VII with lithium aluminum hydride (LAH) in a suitable solvent such as diethylether (ether) or tetrahydrofuran (THF).

In Step *e*, compound VIII (a benzyl-substituted compound) is converted to compound IX (a quaternary ammonium salt) by treatment with $R^3X$ which is a lower hydrocarbon halide, e.g. methyl iodide, preferably in a solvent, e.g. ethanol.

Step *f* is an elimination reaction in which compound IX is treated with a strong base, e.g. $NaOCH_3$ to form the corresponding compound I.

Alternatively, one can proceed directly to obtain compound VI by reacting compound III and compound V in the presence of a small amount of strong acid such as p-toluenesulfonic acid, preferably in a solvent, e.g. toluene.

Compound III may be obtained by reacting glutaric acid anhydride with a Grignard reagent, prepared from mangesium and an $ArCH_2$ halide, e.g. benzyl bromide, by well known methods.

Compounds VIII*a*, i.e. compounds VIII wherein $n=0$, e.g. 1,2,3,5,6,10b - hexahydropyrrolo[2,1 - a]isoquinolines are useful in preparing compounds I*a*, and may be prepared by following reaction scheme B wherein $R^1$, $R^2$ and Ar are as defined above:

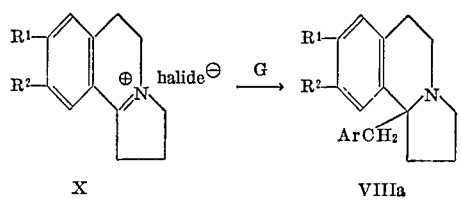

According to reaction scheme B compound X, e.g.

1,2,5,6 - tetrahydropyrrolo[2,1 - a]isoquinolinium bromide, is reacted, e.g. by heating, with compound G (a Grignard reagent) in a solvent, e.g. ether, to obtain compound VIII*a*. The Grignard reagent is formed from magnesium and a benzyl halide. Compound VIII*a* is converted to the corresponding compound I*a*, by Steps *e* and *f* of the above-described reaction scheme A.

Compounds II may be prepared by reaction scheme C, wherein Ar, $R^1$, $R^2$, $R^3$ and X are as defined above:

Reaction Scheme C

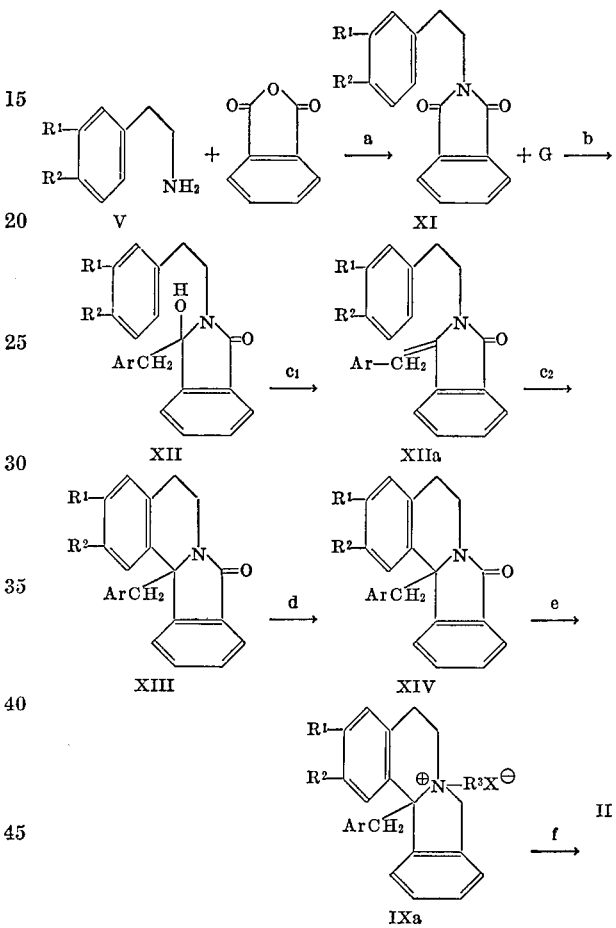

According to the reaction scheme C for the preparation of compounds II:

In Step *a*, compound V, e.g. phenylethylamine, is condensed with phthalic anhydride to form compound XI (a N - [2 - (phenyl)ethyl]phthalimide), e.g. by heating in an inert solvent, e.g. ortho-dichlorobenzene.

In Step *b*, compound XI is reacted with compound G (a Grignard reagent prepared from a benzyl halide) in a suitable inert solvent, e.g. ether, to form an intermediate compound XII which is then decomposed with dilute base, e.g. dilute ammonium hydroxide.

In Step *c*, compound XII is cyclized, e.g. as in Step *c* of reaction scheme A, the cyclization of compound XII occurs in two sequential stages, i.e. stages $c_1$ and $c_2$ (without separation). The intermediate (compound XII*a*) forms and cyclizes to compound XIII, which is a lactam.

In Step *d*, compound XIII is reduced, e.g. as in Step *d* of reaction scheme A to give compound XIV. Compound XIV is then converted to compound IX*a* (the corresponding quaternary ammonium salt) by treatment with $R^3X$. Compound IX*a* is then converted to the corresponding compound II as in Steps *e* and *f* of reaction scheme A.

By following the methods of preparation described in reaction scheme A, and selecting appropriate starting materials, the desired compound I is obtained. For example, if one uses as compound V, 3,4-dimethoxyphenylethylamine, and as compound III, 6-phenyl-5-oxo-caproic acid, and as R³X, methyl iodide, then the corresponding compound I is obtained, i.e. 8-benzylidene-10,11 - dimethoxy - 3 - methyl - 1,2,3,4,5,6,7,8 - octahydro-3-benzazecine which is a compound I wherein $n$ is 1, $R^1$ and $R^2$ are each lower linear alkoxy, $R^3$ is a lower linear alkyl and $A^1$, $A^2$ and $A^3$ are each hydrogen atoms. By using allyl bromide or crotonyl bromide in place of the methyl iodide, the corresponding compound I is obtained. Similarly, use of phenylethylamine or 4-propoxyphenylethylamine, i.e. a compound V wherein $R^1$ and $R^2$ are each hydrogen or wherein $R^1$ is hydrogen and $R^2$ is a lower linear alkoxy, gives the corresponding compound I, respectively. Use of homopiperonylamine, i.e. a methylenedioxy-containing compound V, gives the corresponding compound I, i.e. one having a methylendioxy substituent. Similarly, by selection of the compound III, the corresponding compound I having $n$, $A^1$, $A^2$ and $A^3$ as desired may be obtained. For example, use of a keto-acid as compound III wherein Ar is a 3,4-methylenedioxy-substituted phenyl gives the corresponding compound I. Likewise, use of a keto acid as compound III wherein Ar is a 2,3-dichlorophenyl, 3,5-diethylphenyl or p-methoxyphenyl yields the corresponding compound I.

Similarly, in following reaction schemes B and C, one may vary the starting materials to obtain the corresponding compounds Ia and II.

Compounds I, and II and their pharmaceutically acceptable acid addition and quanternary ammonium salts are useful as anti-inflammatories. Compound I and their pharmaceutically acceptable acid addition and quaternary ammonium salts are also useful as hypotensives. They are administered to mammals either orally or parenterally in daily doses of from 5 to 50 mg./kg. of body weight, e.g. from 300 to 3500 milligrams per diem, preferably administered in divided doses from 2 to 4 times a day; a single daily oral dose is also acceptable.

The acid addition and quaternary ammonium salts of compounds I, and II are prepared according to well known procedures from compounds I and II, respectively. They are all useful, in accord with recognized procedures, for the preparation of corresponding pharmaceutically acceptable salts.

Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkysulfonic acid, such as methylsulfonic acid ($H_3C-SO_3H$); dibasic acids, e.g. succinic acid; tribasic acids, e.g. phosphoric acid and citric acid; saturated acids, e.g. acetic acid; ethylenically unsaturated acids, e.g. maleic acid and fumaric acid; and aromatic acids, e.g. salicylic acid and arylsulfonic acids, such as phenylsulfonic acid. The only limitation on the acid is that the resulting salt be pharmaceutically acceptable; it is preferred, however, that the acid addition salt be water-soluble.

Each of the pharmaceutically active compounds of this invention may be, e.g. incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 210 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compounds is:

| | Parts |
|---|---|
| Title Compound of Example 1 | 75 |
| Tragacanth | 2 |
| Lactose | 14.5 |
| Corn starch | 5 |
| Talcum | 3 |
| Magnesium stearate | 0.5 |
| Alcohol SD–30, Purified Water, q.s. | |

Examples illustrative of this invention follow. In the examples all temperatures are centigrade and all percents and parts are by weight, unless specified otherwise. Parts by weight are related to parts by volume as a kilogram is related to a liter.

Preparation of 8,9 - dimethoxy-1,2,5,6-tetrahydropyrrolo[2,1-a]isoquinolinium bromide used in Examples 2 and 3 may be obtained by the method of preparation described in Synthesis of Dimethylapoerysopine and an Approach to the Total Synthesis of the Unrearranged Erythrina Bases, by K. Wiesner, Z. Valenta, A. J. Manson and F. W. Stonner in the Journal of American Chemical Society, volume 77, pp. 675 to 683 (1955).

EXAMPLE 1

8-(p-chlorobenzylidene)-10,11-dimethoxy-3-methyl-1,2,3,4,5,6,7,8-octahydro-3-benzazecine

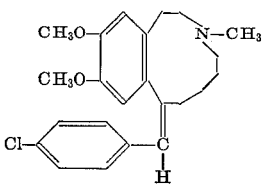

This example illustrates the preparation of compounds I according to the procedure of reaction scheme A; described above.

(a) Preparation of 6-(4-chlorophenyl)-5-oxo-caproic acid

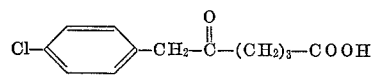

A solution of a Grignard reagent, prepared from 36 parts of p-chlorobenzyl chloride and 6 parts of magnesium in 500 parts by volume of ether is added to a solution of 23 parts of glutaric acid anhydride in 500 parts by volume of benzene with stirring and cooling. The reaction mixture is stirred for 2 hours and subsequently 500 parts by volume of water is added and then 300 parts by volume of dilute (5%) ammonium hydroxide is added. The aqueous phase is acidified with hydrochloric acid and extracted with methylene chloride. The extract is dried over sodium sulphate and evaporated to obtain compound (a), which may be used for Step (b) without further purification.

(b) Preparation of N-[2-(3,4-dimethoxyphenyl)ethyl]-6-(4-chlorophenyl)-5-oxo-caproic acid amide

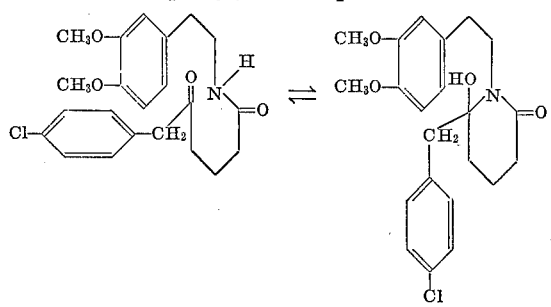

A solution of 12 parts of compound (a), 9 parts of 3,4-dimethoxyphenylethoylamine and 0.15 parts of p-toluenesulphonic acid in 300 parts by volume of toluene is heated in a water separator at reflux for 18 hours. The reaction mixture is subsequently reduced in volume in a vacuum, dissolved in chloroform, washed first with 2 N hydrochloric acid and then with a 2 N sodium carbonate solution, dried over sodium sulphate and evaporated in a vacuum, yielding 20 parts of crude compound (b), which may be used for Step (c) without further purification.

(c) Preparation of 11-b-(p-chlorobenzyl)-9,10-dimethoxy-1,2,3,4,6,7-hexahydro-11b-benzo[a]quinolizin-4-one

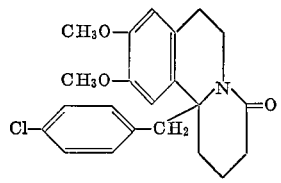

A mixture of 28 parts of compound (b), 500 parts by volume of methanol and 25 parts by volume of concentrated hydrochloric acid is heated at reflux for 24 hours. The reaction mixture is subsequently concentrated in a vacuum. Water is added to the reaction mixture, giving 22 parts of compound (c) in the form of a crystalline precipitate, M.P. 187° to 189° C.

(d) Preparation of 11b-(p-chlorobenzyl)-9,10-dimethoxy-1,2,3,4,6,7-hexahydro-11b-benzo[a]quinolizine

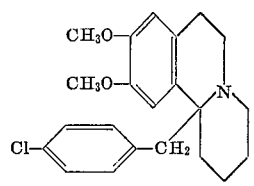

A solution of 25 parts of compound (c) in 200 parts by volume of tetrahydrofuran (THF) is added to a solution of 10 parts of lithium aluminum hydride in 500 parts by volume of ether and heating at reflux is effected for 24 hours. Water is added to the reaction mixture and filtration is effected through "Celite" (diatomaceous earth). The organic phase of the filtrate is dried over soduim sulfate and then evaporated under vacuum and the residue recystallized from ether yielding 15 parts of compound (d), M.P. 122° to 123° C.

(e) Preparation of 11b-(p-chlorobenzyl)-9,10-dimethoxy-1,2,3,4,6,7 - hexahydro - 11bH - benzo[a] quinolizine methiodide

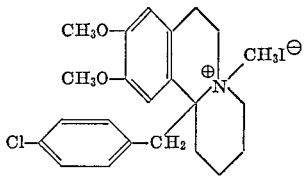

A solution of 16 parts of compound (d) in 100 parts by volume of ethanol and 30 parts by volume of methyl iodide is heated under reflux for about 16 hours. The reaction mixture is then evaporated by dryness under vacuum yielding compound (e), i.e. methiodide of compound (d) as a red gum.

(f) preparation of 8-(p-chlorobenylidene)-10-11-dimethoxy-3-methyl-1,2,3,4,5,6,7,8-octahydro-3-benzazecine Twenty parts of compound (e) in 30 parts by volume of methanol are mixed with 3 parts sodium dissolved in 150 parts by volume methanol and the mixture refluxed for about 16 hours. The mixture is then cooled, yielding 13 parts of the title compound, M.P. 139° to 142° C.

Following the procedure described in this example, but replacing the p-chlorobenzyl group-containing Grignard reagent with a p-methoxybenzyl- or benzyl-containing Grignard reagent, the corresponding compound I is obtained.

EXAMPLE 2

7-benzylidene-9,10-dimethoxy-3-methyl-1H-2,3,4,5,6,7-hexahydro-3-benzazonine

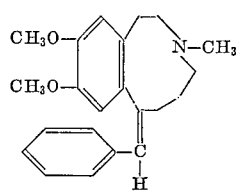

This example illustrates the preparation of a compound Ia according to reaction scheme B described above.

(a) Preparation of 8,9-dimethoxy-10b-benzyl-1,2,3,5,6,10b-hexahydropyrrolo[2,1-a]isoquinoline bimaleate

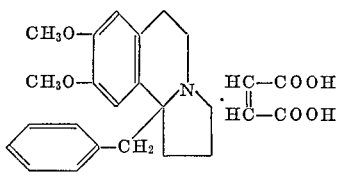

31.2 parts of 8,9-dimethoxy-1,2,5,6-tetrahydropyrrolo-[2,1-a]isoquinolinium bromide are added to a solution of a Grignard reagent, produced from 48 parts of magnesium and 3.42 parts of benzylbromide in 2,000 parts by volume of ether, and the mixture heated at reflux with stirring for 24 hours. The reaction mixture is poured into a dilute (5%) ammonium hydroxide solution containing ice, the ether layer is separated and the aqueous phase extracted thrice with ether. The ether phases are combined, dried over sodium sulphate and evaporated. The residue is dissolved in ethanol and a solution of 11 parts of maleic acid in 50 parts by volume of methanol is added. Ether is added, whereby compound (a), M.P. 159° to 161° C., precipitates from solution.

(b) Preparation of 10b-benzyl-9,10-dimethoxy-1,2,3,5,6,10b-hexahydropyrrolo[2,1-a]isoquinoline methiodide

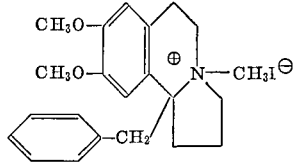

Compound (a) is converted to the corresponding methiodide, i.e. compound (b) by mixing 10 parts of compound (a) in the free amine form thereof in 13 parts by volume of methanol, 90 parts by volume of ether and 20 parts by volume of methyl iodide, and the mixture allowed to stand at room temperature for 16 hours. Compound (b) precipitates as crystals, M.P. 260° to 262° C.

(c) Preparation of 7 - benzylidene-9,10-dimethoxy-3-methyl-1H-2,3,4,5,6,7-hexahydro-3-benzazonine A solution of 3.2 parts of sodium in 225 parts by volume of methanol is added to a suspension of 21 parts of compound (b) in 80 parts by volume of methanol. The mixture is heated under reflux for 4½ hours, diluted with 400 parts by volume of water and cooled to give 14 parts of crystals of the title compound, M.P. 108° to 110° C.

Following the procedure described in this example but replacing the 8,9-dimethoxy-1,2,5,6-tetrahydropyrrolo-[2,1-a]isoquinolinium bromide with 8,9-dimethyl-1,2,5,6-tetrahydropyrrolo[2,1-a]isoquinolinium bromide, the corresponding compound I(a) is obtained.

EXAMPLE 3

7-(p-chlorobenzylidene)-9,10-dimethoxy-3-methyl-1H-2,3,4,5,6,7-hexahydro-3-benzazonine

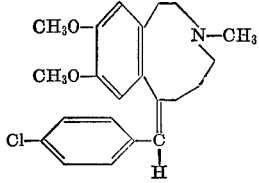

(a) Preparation of 10b-chlorobenzyl-8,9-dimethoxy-1,2,3,5,6,10b-hexahydropyrrolo[2,1-a]isoquinoline

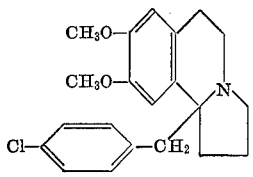

Forty-four parts of 8,9-dimethoxy-1,2,5,6-tetrahydropyrrolo[2,1-a]isoquinolinium bromide are added to a solution of a Grignard reagent produced from 65 parts of magnesium and 456 parts of p-chlorobenzyl bromide in 2,500 parts by volume of ether and heating at reflux is subsequently effected for 24 hours with stirring. The reaction mixture is poured into a dilute (5%) ammonium hydroxide solution containing ice, the ether layer is separated and the aqueous phase extracted thrice with ether. The ether phases are combined, dried over sodium sulphate and evaporated. The residue is recrystallized from benzene-pentane and 35 parts of compound (a), M.P. 125° to 126° C., is obtained.

(b) Preparation of 7-(p-chlorobenzylidene)-9,10-dimethoxy-3-methyl-1H-2,3,4,5,6,7-hexahydro-3-benzazonine Following a procedure as described in Steps (b) and (c) in Example 2, the methiodide of compound (a) is prepared by mixing 11 parts of compound (a) in 100 parts by volume of ethanol with 20 parts by volume of methylene chloride and 30 parts by volume of methyl iodide and the mixture allowed to stand at room temperature for 16 hours. The mixture is evaporated and the residue yields 12 parts of crystals of the methiodide from acetone.

Twelve parts of the methiodide in 45 parts by volume of methanol is mixed with 2.3 parts of sodium dissolved in 150 parts by volume of methanol and the mixture refluxed for 6½ hours. The mixture is then diluted with 100 parts by volume of water and filtered, to obtain 8 parts of crystals of the title compound, M.P. 132° to 134° C.

Following the procedure described in this example but replacing the p-chlorobenzyl-containing Grignard reagent with an m-ethoxybenzyl-containing Grignard reagent, the corresponding compound Ia is obtained.

EXAMPLE 4

13-benzylidene-2,3-dimethoxy-7-methyl-5,6,8,13-tetrahydrodibenz[c,f]azonine

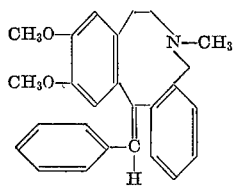

This example illustrates the preparation of the title compound, which is a compound II, according to the procedure of reaction scheme C, described above.

(a) Preparation of N-[2-(3,4-dimethoxyphenyl)ethyl]phthalimide

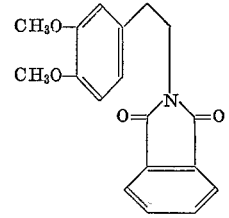

A solution of 108 parts of 3,4-dimethoxyphenylethylamine 86 parts of phthalic anhydride in 200 parts by volume of ortho-dichlorobenzene is heated under reflux for 3 hours. After cooling, the solid product is collected by filtration and recrystallized from chloroform-methanol to obtain 165 parts of compound (a), M.P. 169° to 170° C.

(b) Preparation of 12b-benzyl-2,3-dimethoxy-8-oxo-5,6,8,12b-tetrahydroisoindolo[1,2-a]isoquinoline

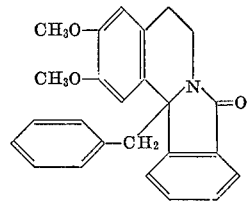

A Grignard reagent is prepared from 13.3 parts of magnesium and 95.2 parts of benzyl chloride in 800 parts by volume of ether and reacted with 108 parts of compound (a) suspended in 1,500 parts by volume of THF by stirring for 16 hours at room temperature. Dilute (5%) ammonium hydroxide is then added to the reaction mixture. The organic layer is separated, dried over sodium sulfate and evaporated to give a crystalline residue which is then washed with ether yielding 120 parts of an intermediate product, which is then heated under reflux in 2,000 parts by volume of methanol and 150 parts by volume of concentrated hydrochloric acid for 20 hours. The reaction mixture is evaporated and the residue crystallizes from methanol yielding 90 parts of compound (b), M.P. 175° to 176° C.

(c) Preparation of 12b-benzyl-2,3-dimethoxy-5,6,8,12b-tetrahydroisoindolo[1,2-a]isoquinoline

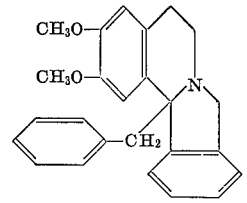

A solution of 85 parts of compound (b) in 1,000 parts by volume of THF is added dropwise over a period of ½ hour to 40 parts of LAH in 2,000 parts by volume of ether and the mixture refluxed for 24 hours. The mixture is then cooled and decomposed by the addition of water. The organic phase is recovered and dried and then filtered through "Celite." The filtrate is evaporated under vacuum and crystallized from ether to obtain 53 parts of compound (c), M.P. 130° to 131° C.

(d) Preparation of 12b-benzyl-2,3-dimethoxy-5,6,8,12b-tetrahydroisoindolo[1,2-a]isoquinoline methiodide

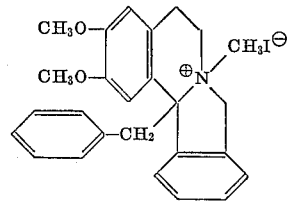

Twenty parts of compound (c) is mixed with 40 parts by volume of methyl iodide and 150 parts by volume of ethanol, and the mixture allowed to stand for 16 hours. The mixture is then evaporated to dryness yielding compound (d) as a gum, which may be used in the subsequent Step (e) without further refining.

(e) Preparation of 13-benzylidene-2,3-dimethoxy-7-methyl-5,6,8,13-tetrahydrodibenz[c,f]azonine Twenty-five parts of crude compound (d) in 40 parts by volume methanol are mixed with 4 parts of sodium dissolved in 200 parts by volume methanol and the mixture refluxed for 4 hours. The mixture is then concentrated under vacuum and worked up to give 14 parts of crystals of the title compound, M.P. 135° to 145° C.

Following the procedure described in this example, but starting with 3-methoxyphenylethylamine in place of 3,4-dimethoxyphenylethylamine, the corresponding compound II is obtained.

EXAMPLE 5

7-allyl-13-benzylidene-2,3-dimethoxy-5,6,8,13-tetrahydrodibenz[c,f]azonine

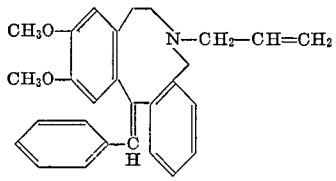

Following the general procedure described in Steps d and e of Example 4, 20 parts of 12b-benzyl-2,3-dimethoxy-5,6,8,12b - tetrahydroisoindolo[1,2-a]isoquinoline (compound (c) of Example 4), 20 parts by volume of allyl bromide and 150 parts by volume of ethanol are refluxed for 16 hours. The mixture is then evaporated to dryness and the residue triturated with ether. The ether is decanted and the quaternary salt of the starting product remains as a gum. Twenty-five parts of the gum in 50 parts by volume of methanol are added to 5 parts of sodium dissolved in 200 parts by volume of methanol and the mixture refluxed for 2½ hours yielding 8.5 parts of crystals of the title compound, M.P. 130° to 133° C.

This example illustrates the preparation of a compound II. Replacing the allyl bromide with crotonyl bromide results in the preparation in a similar manner, of the corresponding compound II.

EXAMPLE 6

13-(-p-chlorobenzylidene)-2,3-dimethoxy-7-methyl 5,6,8,13-tetrahydrodibenz[c,f]azonine

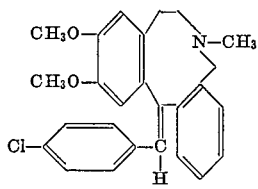

This example illustrates the preparation of the title compound which is a compound II.

(a) Preparation of 12b-(p-chlorobenzyl)-2,3-dimethoxy-8-oxo-5,6,8,12b-tetrahydroisoindolo[1,2-a]isoquinoline

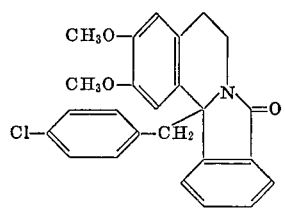

A Grignard reagent is prepared from 2 parts of magnesium and 12 parts of p-chlorobenzyl chloride in 100 parts by volume of ether, and added dropwise to a stirred suspension of 15.5 parts of N-[2-(3,4-dimethoxyphenyl)ethyl]phthalimide (which may be prepared as described above in Example 4) in 200 parts by volume of THF. The mixture is stirred for 16 hours and then dilute (5%) ammonium hydroxide added. The organic layer is dried over sodium sulfate and evaporated to give a crystalline residue, which is then washed with a small amount of ether, yielding 16 parts of intermediate product.

The intermediate product is heated under reflux for 16 hours in 300 parts by volume of methanol and 15 parts by volume of concentrated hydrochloric acid. The mixture is then evaporated and the residue crystallized from methanol yielding 11 parts of compound (a), M.P. 193° to 194° C.

(b) Preparation of 12b-(p-chlorobenzyl)-2,3-dimethoxy-5,6,8,12b-tetrahydroisoindolo[1,2-a]isoquinoline

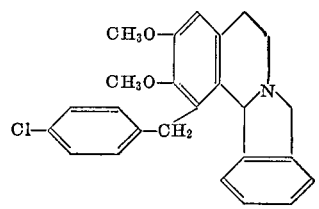

A solution of 55 parts of compound (a) in 800 parts by volume of THF is dded dropwise over 20 minutes to a solution of 17 parts of LAH in 1,500 parts by volume of ether and heated under reflux for 20 hours. The mixture is then cooled and decomposed by the addition of water, and filtered through "Celite." The organic phase of the filtrate is evaporated under vacuum and crystallized from ether to give 44 parts of compound (b), M.P. 126° to 127° C.

(c) Preparation of 13 - (p - chlorobenzylidene)-2,3-dimethoxy-7-methyl - 5,6,8,13 - tetrahydro[c,f]dibenzazonine Compound (b) is converted to its quaternary salt by mixing 30 parts thereof with 200 parts by volume of ethanol and 50 parts by volume of methyl iodide. The mixture is allowed to stand for 16 hours, then evaporated to dryness yielding 40 parts of the corresponding methiodide as a gummy product.

Forty parts of the methiodide is mixed with 120 parts by volume of methanol and 6 parts of sodium in 240 parts by volume of methanol, the mixture is refluxed for 3 hours, then cooled. Twenty-six parts of the title compound are recovered as crystals from the cooled mixture, M.P. 146° to 149° C. The mother liquor contains an isomer of the title compound as is shown in Example 7, below.

Replacing the p-chlorobenzyl chloride with 3,5-dimethyl- or 3,4,5-trifluorobenzyl chloride results in the preparation, in a similar manner, of the corresponding compound II.

EXAMPLE 7

Isomer of 13-(p-chlorobenzylidene)-2,3-dimethoxy-7-methyl-5,6,8,13-tetrahydrodibenz[c,f]azonine The mother liquor obtained in Example 6 is diluted with water, and 3.5 parts of the solid separates from the diluted mother liquor. The solid is crystallized twice from methanol yielding 2.5 parts of product having a melting point of 130° to 140° C., which product is an isomer of the 13-(p-chlorobenzylidene)-2,3-dimethoxy - 7 - methyl-5,6,8,13-tetrahydrodibenz[c,f]azonine of Example 6.

EXAMPLE 8

Isomer of 13-(p-chlorobenzylidene)-2,3-dimethoxy-7-methyl-5,6,8,13-tetrahydrodibenz[c,f]azonine One part of 13-(p-chlorobenzylidene)-2,3-dimethoxy-7-methyl-5,6,8,13-tetrahydrodibenz[c,f]azonine prepared as in Example 6 in 250 parts of cyclohexane are placed in a quartz vessel under an atmosphere of nitrogen and irradiated for 22 hours with 250 millimicron wave length light. The solution is then evaporated under vacuum and the resulting residue taken up in methanol, from which is crystallized 0.5 part of starting material. The mother liquor is evaporated and taken up in methanol from which is crystallized 0.15 part of the isomer of the starting material, M.P. 130° to 140° C.

What is claimed is:

1. A member selected from the group consisting of the free base and, a pharmaceutically acceptable acid addition salt thereof; the free base being of one of the formulae:

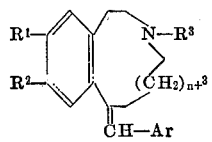

I and

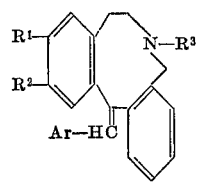

II wherein $n$ is 0 or 1;

$R^1$ is a member selected from the group consisting of a hydrogen atom, linear alkyl having from 1 to 4 carbon atoms, linear alkoxy having from 1 to 4 carbon atoms, and taken together with $R^2$, methylenedioxy;

$R^2$ is a member selected from the group consisting of a hydrogen atom, linear alkyl having from 1 to 4 carbon atoms, linear alkoxy having from 1 to 4 carbon atoms and, taken together with $R^1$, methylenedioxy;

$R^3$ is a member selected from the group consisting of allyl, crotonyl and linear alkyl having from 1 to 4 carbon atoms; and Ar is of the formula:

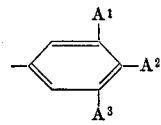

wherein each of $A^1$, $A^2$ and $A^3$, independently, is a member selected from the group consisting of a hydrogen atom, fluoro, chloro, linear alkyl having from 1 to 4 carbon atoms, linear alkoxy having from 1 to 4 carbon atoms and, taken together with its adjacent counterpart, methylenedioxy.

2. A compound according to claim 1 wherein the free base is of Formula I.

3. A compound according to claim 2 wherein $n$ is 1, Ar is p-chlorophenyl, each of $R^1$ and $R^2$ is methoxy and $R^3$ is methyl.

4. A compound according to claim 2 wherein $n$ is 0, Ar is phenyl, each of $R^1$ and $R^2$ is methoxy and $R^3$ is methyl.

5. A compound according to claim 2 wherein $n$ is 0, Ar is p-chlorophenyl, each of $R^1$ and $R^2$ is methoxy and $R^3$ is methyl.

6. A compound according to claim 1 wherein the free base is of Formula II.

7. A compound according to claim 6 wherein Ar is phenyl, each of $R^1$ and $R^2$ is methoxy and $R^3$ is methyl.

8. A compound according to claim 6 wherein Ar is phenyl, each of $R^1$ and $R^2$ is methoxy and $R^3$ is allyl.

9. A compound according to claim 6 wherein Ar is p-chlorophenyl, each of $R^1$ and $R^2$ is methoxy and $R^3$ is methyl.

References Cited

Chemical Abstracts, vol. 67, p. 6096 (1967) (abstract No. 64590h).

JOHN D. RANDOLPH, Primary Examiner

U.S. Cl. X.R.

260—294.7, 283, 289, 325, 326, 326.5, 521, 562; 424—244